United States Patent [19]

Demmler et al.

[11] 4,405,765
[45] Sep. 20, 1983

[54] CURABLE EPOXY RESINS

[75] Inventors: Kurt Demmler, Ludwigshafen; Wolfram Ochs, Wachenheim, both of Fed. Rep. of Germany

[73] Assignee: BASF Aktiengesellschaft, Fed. Rep. of Germany

[21] Appl. No.: 413,084

[22] Filed: Aug. 30, 1982

[30] Foreign Application Priority Data

Sep. 9, 1981 [DE] Fed. Rep. of Germany ....... 3135636

[51] Int. Cl.³ .............................................. C08G 59/68
[52] U.S. Cl. ..................................... 525/506; 528/89; 528/90; 528/91; 528/92; 528/88; 528/361; 528/408; 528/409
[58] Field of Search .................... 525/506; 528/88, 89, 528/90, 91, 92, 361, 408, 409

[56] References Cited

U.S. PATENT DOCUMENTS 3,720,634 3/1973 Statton ............................ 260/18 PF

FOREIGN PATENT DOCUMENTS 2518652 11/1975 Fed. Rep. of Germany .
372237 9/1970 U.S.S.R. .
637409 12/1975 U.S.S.R. .

OTHER PUBLICATIONS

Research Disclosure, Nov. 1981, pp. 398–399, No. 21114.

Primary Examiner—Earl A. Nielsen
Attorney, Agent, or Firm—Keil & Witherspoon

[57] ABSTRACT

A curable resin is composed of
A. an epoxy resin and
B. a pyrylium salt as a catalyst, with or without
C. a metal chelate or metal salt as a co-catalyst.
Preferred pyrylium salts are those of the formula

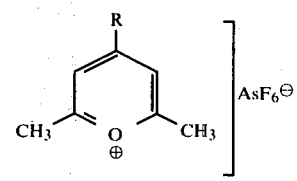

Preferred co-catalysts are acetylacetonates, stearates, benzoates, naphthenates, octoates or phthalates of $Cu^{++}$, $Co^{++}$, $Co^{+++}$, $Fe^{+++}$ or $Al^{+++}$. The resin compositions may be used to produce coatings and moldings.

7 Claims, No Drawings

CURABLE EPOXY RESINS

Epoxy resins are conventionally hardened by means of an amine, phenol or a carboxylic acid or its anhydride. Owing to the high reactivity of the two components, they must be handled separately and, after they have been mixed together, the mixture must be processed rapidly.

One-component systems have also been developed, in which the epoxy resin contains a radiation-sensitive onium salt, and hardening of the resin, which has a long shelf life and is readily handled and processed, is initiated by irradiation. Iodonium salts have been employed industrially, but these are highly toxic. German Published Application DOS No.2,518,652 describes curable compositions comprising an epoxy resin and a radiation-sensitive onium salt of an element of main group 6 of the periodic table. However, when the preferred sulfonium salts are used, the moldings obtained after hardening have rough or matt surfaces and low stability to methylene chloride. Moreover, the unpleasant odor of the sulfonium salts is a source of annoyance during the mixing of the components and the processing of the resins.

It is an object of the present invention to provide curable epoxy resins which contain an effective hardening catalyst, have a long shelf life, are readily handled and processed, are non-toxic and, after hardening, give moldings which have good surfaces and are stable to solvents.

We have found that this object is achieved if from 0.5 to 10, preferably from 1 to 8, % by weight, based on the resin composition, of a pyrylium salt is used as the catalyst. The pyrylium salt is of the formula

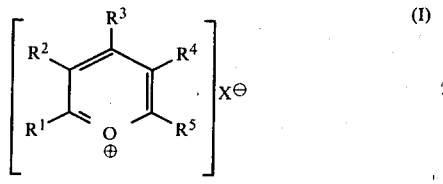

where $R^1$ and $R^5$ are identical and are each alkyl or aralkyl, each of 1 to 8 carbon atoms, and $R^2$, $R^3$ and $R^4$ are identical or different and are each hydrogen, or alkyl, alkaryl or cycloalkyl, each of not more than 8 carbon atoms, or an unsubstituted or alkyl-substituted phenyl, naphthyl, indenyl, indanyl or fluorenyl group or a heterocyclic substituent containing one or two heteroatoms. $R^1$, $R^2$, $R^3$, $R^4$ and $R^5$ are isolated substituents and are not bonded to one another via ring systems. Preferably, $R^1$ and $R^5$ are each methyl, $R^2$ and $R^4$ are each hydrogen and $R^3$ is phenyl, naphthyl or cyclohexyl.

$X^\ominus$ is a non-nucleophilic, weakly basic anion, preferably $AsF_6^\ominus$, $SbF_6^\ominus$, $BF_4^\ominus$, $PF_6^\ominus$, $CF_3SO_3^\ominus$ or $ClO_4^\ominus$. The pyrylium hexafluoroarsenates, which are preferably employed, are non-toxic, and do not produce any decomposition products having an annoying odor. The pyrylium salts are known, and their preparation is described, for example, by A. V. Baeyer, Liebigs Annalen 384 (1911), 208.

For the purposes of the invention, epoxy resins are monomeric, dimeric, oligomeric or polymeric compounds having terminal epoxide groups or epoxide groups present in side-chains or in cyclic systems. One or more epoxide groups may be present in the molecule. The resin may also contain other functional groups, eg. hydroxyl, carboxyl, anhydride, ester, siloxane or isocyanate groups. Preferred epoxy resins are reaction products of bisphenol A, a novolak resin, diaminodiphenylmethane, p-aminophenol, an isocyanurate or hydantoin with epichlorohydrin, and cycloaliphatic epoxides and cycloaliphatic epoxide esters. The epoxide resins can contain the conventional diluents, eg. phenyl glycidyl ether, glycidyl acrylate or methacrylate, styrene oxide or allyl glycidyl ether, as viscosity regulators.

Preferably, the novel resin composition additionally contains, as a co-catalyst, from 0.01 to 10, preferably from 0.1 to 5, % by weight of a metal chelate $C_1$ or of a metal salt $C_2$. The metal chelate $C_1$ is of the formula

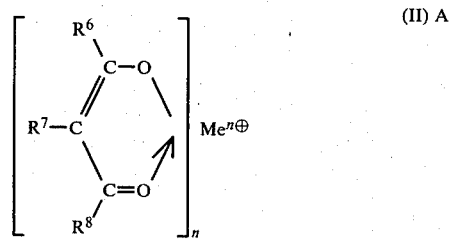

where Me is a monovalent, divalent, trivalent or tetravalent metal, $R^7$ is hydrogen, or alkyl, cycloalkyl, aryl or alkaryl of not more than 8 carbon atoms, $R^6$ and $R^8$ are identical or different and are each alkyl, cycloalkyl, aryl, aralkyl or alkaryl, each of not more than 8 carbon atoms, wherein $R^6$ and $R^8$ may furthermore be bonded to one another by a ring system, and n is an integer from 1 to 4. Examples of suitable metal cations are $Ti^{4+}$, $Zn^{2+}$, $Zr^{4+}$, $Ba^{2+}$, $Ca^{2+}$, $Ce^{4+}$, $Cr^{3+}$, $Pb^{2+}$, $Mg^{2+}$, $Sn^{4+}$, $Nn^{2+}$, $Ni^{2+}$, $V^{3+}$ and $V^{4+}$, $Al^{3+}$, $Cu^{2+}$, $Fe^{3+}$, $Co^{2+}$ and $Co^{3+}$ being preferred. Preferred metal chelates are the acetylacetonates.

The metal salts $C_2$ are those of monovalent, divalent, trivalent or tetravalent metals with aliphatic or aromatic mono- or polycarboxylic acids of 6 to 20 carbon atoms, suitable metals being those mentioned above. Preferred salts of this type are the stearates, benzoates, naphthenates, octoates and phthalates of $Cu^{2+}$, $Co^{2+}$, $Co^{3+}$, $Fe^{3+}$ and $Al^{3+}$.

The co-catalysts may be employed as such or in the form of a solution, for example in a hydrocarbon. A mixture of a metal chelate $C_1$ and a metal salt $C_2$ may also be used. Addition of the co-catalyst can reduce the temperature at which hardening occurs (start temperature) and the hardening time. In many cases, the shelf life of the resin is also increased.

The curable resin composition is prepared by mixing the epoxy resin A with the catalyst B, with or without the addition of a co-catalyst $C_1$ or $C_2$. The mixture may be modified with a diluent, and may be mixed with reinforcing materials, fillers, dyes or pigments, processing assistants or other conventional additives. It is then brought into a suitable form, for example by being cast as a thin film. The resin is hardened by heating it at from 80° to 160° C., preferably from 100° to 150° C.

The hardening process is generally complete after from 0.5 to 20 minutes. The resulting molding has a smooth, glossy surface, and, after post-hardening at 200° C. for one hour, its glass temperature is from 170° to 190° C. It has a high crosslinking density, and the shear modulus G' of the elastomeric material is from 40° to 50° N.mm$^{-2}$. The molding is stable to solvents, and is not attacked when stored in methylene chloride.

The novel curable compositions can be used, for example, for producing protective and insulating coatings, or potting compositions, or as a matrix for reinforced moldings.

EXAMPLES

Resin mixtures were prepared from a bisphenol A diglycidyl ether (®Epon 828 from SHELL), and 2.4% by weight of catalyst, with or without 1% by weight of cocatalyst. Equal amounts of weight of resin mixture were poured into cylindrical molds which were immersed in oil baths preheated to 120° C., 130° C. and 140° C. The samples were provided with thermocouples in order to monitor the temperature, and a temperature/time curve was recorded. From this curve, the beginning of the exothermic crosslinking reaction (detected by comparing the sample temperature with the bath temperature), the associated start temperature and the maximum temperature can be obtained. The hardening time is the period from the beginning of the crosslinking reaction to the time at which the maximum temperature is reached.

The results are given in Table 1.

TABLE 1

| Example | Pyrylium salt | Co-catalyst | | | Start temperature °C. | Maximum temperature °C. | Hardening time min. |
|---|---|---|---|---|---|---|---|
| 1 | 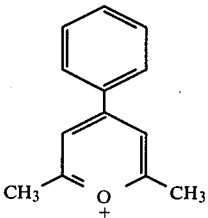 | AsF$_6^-$ | — | | 140 | 254 | 14 |
| 2 | " | ClO$_4$ | — | | 160 | 180 | 10 |
| 3 | " | AsF$_6^-$ | Cu$^{2+}$ | acetylacetonate | 120 | 238 | 5 |
| 4 | " | " | Cu$^{2+}$ | naphthenate | 120 | 180 | 10.5 |
| 5 | " | " | Cu$^{2+}$ | stearate | 120 | 148 | 15 |
| 6 | " | " | Fe$^{3+}$ | acetylacetonate | 120 | 198 | 5.5 |
| 7 | " | " | Co$^{3+}$ | acetylacetonate | 120 | 206 | 10 |
| 8 | " | " | Al$^{3+}$ | acetylacetonate | 120 | 207 | 7.5 |
| 9 | " | " | 0.5 Cu$^{2+}$ 0.5 Cu$^{2+}$ | acetylacetonate naphthenate | 120 | 216 | 6 |
| 10 | 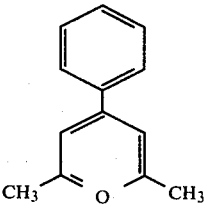 | AsF$_6$ | — | | 150 | 258 | 11 |
| 11 | " | " | Cu$^{2+}$ | acetylacetonate | 120 | 223 | 8 |
| 12 | " | " | Cu$^{2+}$ | naphthenate | 120 | 210 | 5.5 |
| 13 | " | " | 0.5 Cu$^{2+}$ 0.5 Cu$^{2+}$ | acetylacetonate naphthenate | 120 | 242 | 5 |
| 14 | (structure) | AsF$_6$ | — | | 160 | 200 | 5 |
| 15 | " | CF$_3$SO$_3$ | — | | 120 | 280 | 13 |
| 16 | " | AsF$_6$ | Cu$^{2+}$ | acetylacetonate | 120 | 190 | 5 |
| 17 | 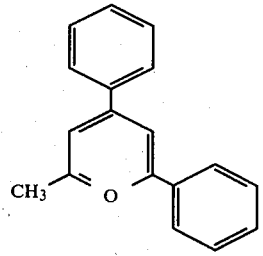 | AsF$_6$ | Cu$^{2+}$ | acetylacetonate | 140 | 264 | 7 |

TABLE 1-continued

| Example | Pyrylium salt | Co-catalyst | | | Start temperature °C. | Maximum temperature °C. | Hardening time min. |
|---|---|---|---|---|---|---|---|
| 18 | 4-(n-C$_8$H$_{17}$)-2,6-dimethylpyrylium | AsF$_6$ | Cu$^{2+}$ | acetylacetonate | 130 | 238 | 9 |
| 19 | 4-(2,4-dimethylphenyl)-2,6-dimethylpyrylium | AsF$_6$ | Cu$^{2+}$ | acetylacetonate | 120 | 190 | 12 |
| 20 | 4-(2-thienyl)-2,6-dimethylpyrylium | AsF$_6$ | Cu$^{2+}$ | acetylacetonate | 120 | 233 | 10 |
| 21 | 4-(1-naphthyl)-2,6-dimethylpyrylium | AsF$_6$ | Cu$^{2+}$ | acetylacetonate | 120 | 263 | 5 |
| 22 | 4-(α-methylbenzyl)-2,6-dimethylpyrylium | AsF$_6$ | Cu$^{2+}$ | acetylacetonate | 120 | 180 | 9 |

For some examples, the following properties of the moldings were measured:

The glass temperature and the crosslinking density were determined by the torsional vibration test, in accordance with DIN 53,445, on samples which were produced by milling from cast sheets which, after crosslinking was complete, had been post-hardened for one hour at 200° C. The height of the shear modulus curve for the elastomeric material was used as a measure of the crosslinking density. To measure the swelling, cubes with an edge length of 1 cm were cut from post-hardened moldings and stored for 120 hours in methylene chloride at 20° C. and for 3 hours in boiling methylene chloride. The swelling was taken as the mean value of five measurements.

The results are given in Table 2.

TABLE 2

| Example | Glass temperature $T_g$ [°C.] | Shear modulus G' [N . mm$^{-2}$] | Swelling CH$_2$Cl$_2$ [%] | |
|---|---|---|---|---|
| | | | 20°, 120 h | 40°, 3 h |
| 3 | 186 | 46 | 11 | 3 |
| 6 | 183 | 50 | 11 | 3 |
| 7 | 183 | 43 | 11 | 3 |
| 11 | 185 | 45 | 5 | 2 |

We claim:

1. A curable resin composition, containing
   A. a cationic polymerizable epoxy resin, and
   B. from 0.5 to 10% by weight of an onium salt as a hardening catalyst, wherein the catalyst is a pyrylium salt of the formula

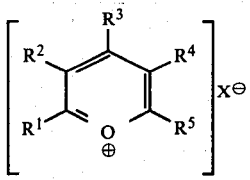

(I)

where $R^1$ and $R^5$ are identical and are each alkyl or alkaryl, each of 1 to 8 carbon atoms, $R^2$, $R^3$ and $R^4$ are identical or different and are each hydrogen, or alkyl, alkaryl or cycloalkyl, each of not more than 8 carbon atoms, or an unsubstituted or alkyl-substituted phenyl, naphthyl, indenyl, indanyl or fluorenyl group or a heterocyclic substituent containing one or two heteroatoms, and $X^\ominus$ is a non-nucleophilic anion.

2. A curable resin composition as claimed in claim 1, wherein the composition additionally contains from 0.01 to 10% by weight of metal chelate ($C_1$) of the formula

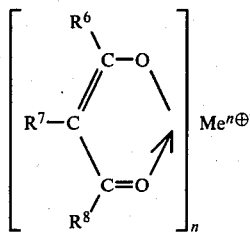

(II) A where Me is a monovalent, divalent, trivalent or tetravalent metal, $R^7$ is hydrogen, or alkyl, cycloalkyl, aryl or alkaryl, each of not more than 8 carbon atoms, and $R^6$ and $R^8$ are identical or different and are each alkyl, cycloalkyl, aryl, aralkyl or alkaryl, each of not more than 8 carbon atoms, wherein $R^6$ and $R^8$ may furthermore be bonded to one another by a ring system, and n is an integer from 1 to 4.

3. A curable resin composition as claimed in claim 1, wherein the composition additionally contains from 0.01 to 10% by weight of a metal salt ($C_2$) of an aliphatic or aromatic mono- or polycarboxylic acid of 6 to 20 carbon atoms.

4. A curable resin composition as claimed in claim 1, wherein the catalyst is a pyrylium salt of the formula

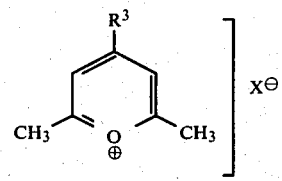

where $R^3$ has the meanings given in claim 1 and $X^\ominus$ is $AsF_6^\ominus$, $BF_4^\ominus$, $SbF_6^\ominus$, $PF_6^\ominus$, $CF_3SO_3^\ominus$ or $ClO_4^\ominus$.

5. A curable resin composition as claimed in claim 2, wherein the metal chelate is an acetylacetonate of $Cu^{++}$, $Co^{++}$, $Co^{+++}$, $Fe^{+++}$ or $Al^{+++}$.

6. A curable resin composition as claimed in claim 3, wherein the metal salt is a stearate, benzoate, naphthenate, octoate or phthalate of $Cu^{++}$, $Co^{++}$, $Co^{+++}$, $Fe^{+++}$ or $Al^{+++}$.

7. A process for the production of a molding from the resin composition as claimed in claim 1, wherein an epoxy resin A is mixed thoroughly with the catalyst B, with or without a co-catalyst $C_1$ or $C_2$, and the mixture is heated at from 80° C. to 160° C.

* * * * *